United States Patent
Barry et al.

(10) Patent No.: US 6,591,419 B2
(45) Date of Patent: *Jul. 8, 2003

(54) DIGITAL MULTI-MEDIA DEVICE AND METHOD RELATING THERETO

(75) Inventors: Richard John Barry, Gt. Missenden (GB); Michael Alexander Webster, Basingstoke (GB); Adrian Charles Paskins, Basingstoke (GB)

(73) Assignee: Sony United Kingdom Limited, Weybridge (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/296,371

(22) Filed: Apr. 22, 1999

(65) Prior Publication Data

US 2002/0196374 A1 Dec. 26, 2002

(30) Foreign Application Priority Data

| Apr. 24, 1998 | (GB) | 9808855 |
| Apr. 24, 1998 | (GB) | 9808857 |
| Apr. 24, 1998 | (GB) | 9808858 |
| Apr. 24, 1998 | (GB) | 9808859 |

(51) Int. Cl.[7] .................. H04N 7/16; H04N 7/167; H04N 7/18; H04N 7/173
(52) U.S. Cl. ............... 725/25; 725/31; 725/80; 725/131; 725/133; 380/210; 380/211
(58) Field of Search .................. 725/31, 80, 74–85, 725/100, 131, 133, 139, 141, 151, 153, 25–30, 149; 380/210–211

(56) References Cited

U.S. PATENT DOCUMENTS

| 4,558,464 A | * | 12/1985 | O'Brien, Jr. ................. 455/4 |
| 4,599,647 A | * | 7/1986 | George et al. ............... 358/122 |
| 5,282,249 A | * | 1/1994 | Cohen et al. ................. 380/23 |
| 5,343,240 A | * | 8/1994 | Yu ................................ 348/14 |
| 5,655,140 A | | 8/1997 | Haddock ............... 395/200.76 |
| 5,666,170 A | * | 9/1997 | Stewart ....................... 348/726 |
| 5,870,474 A | * | 2/1999 | Wasilewski et al. .......... 380/21 |
| 5,920,572 A | * | 7/1999 | Washington et al. ........ 370/535 |
| 6,021,197 A | * | 2/2000 | von Willich et al. ........... 380/5 |
| 6,040,851 A | * | 3/2000 | Cheng et al. ................. 348/10 |
| 6,088,366 A | * | 7/2000 | Sung ........................... 370/468 |
| 6,205,582 B1 | * | 3/2001 | Hoarty ......................... 725/93 |
| 6,223,285 B1 | * | 4/2001 | Komuro et al. ............. 713/160 |
| 6,385,317 B1 | * | 5/2002 | Rix et al. .................... 380/258 |

FOREIGN PATENT DOCUMENTS

| EP | 0 804 033 A2 | 10/1997 |
| EP | 0 844 769 A1 | 5/1998 |
| EP | 0 849 884 A1 | 6/1998 |
| EP | 0 849 913 A2 | 6/1998 |

* cited by examiner

*Primary Examiner*—Andrew Faile
*Assistant Examiner*—Son P. Huynh
(74) *Attorney, Agent, or Firm*—Frommer Lawrence & Haug LLP; William S. Frommer; Darren M. Simon

(57) ABSTRACT

A method of transmitting a transport stream over an IEEE 1394 Serial Bus comprising stripping out of the transport stream identifiable unrequired data so as to reduce the bandwidth of the transport stream, a digital multi-media receiver for transmitting a transport stream to a Conditional Access Module on an IEEE 1394 Serial Bus including a reader for reading the contents of the transport stream and identifying data which is not required for processing by a Conditional Access Module, a stripper for stripping out at least some of the identified unrequired data from the transport stream and a transmitter for transmitting all of the remaining data of the transport stream which has not been stripped and a network of digital multi-media devices connected by means of an IEEE 1394 Serial Bus whereby a first device sends such a stripped transport stream to a second device over the IEEE 1394 Serial Bus.

12 Claims, 7 Drawing Sheets

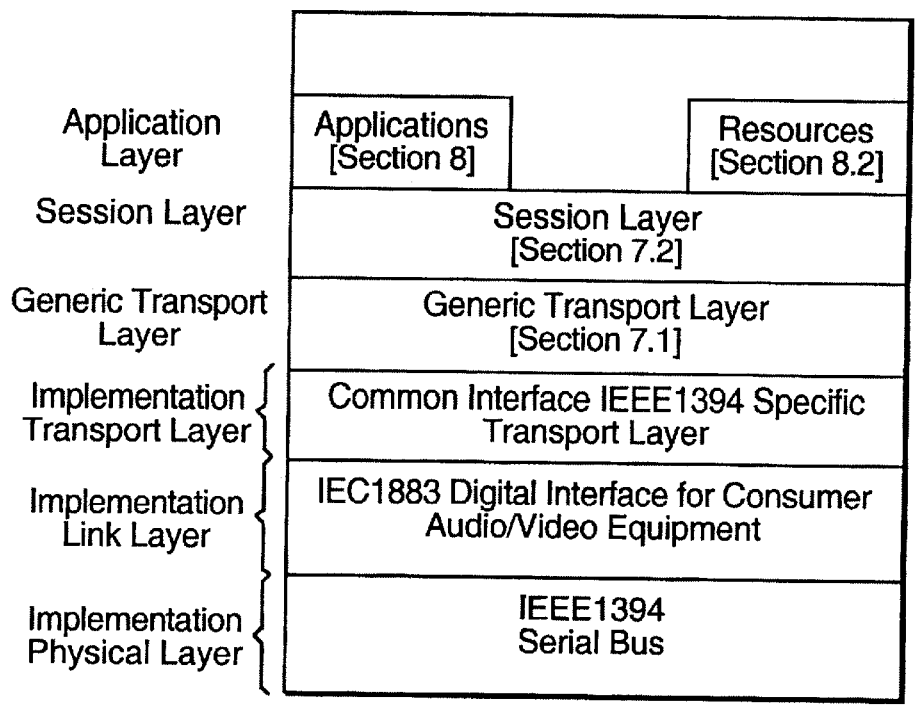
Fig. 7. Common Interface IEEE1394 Implementation Protocol Layers
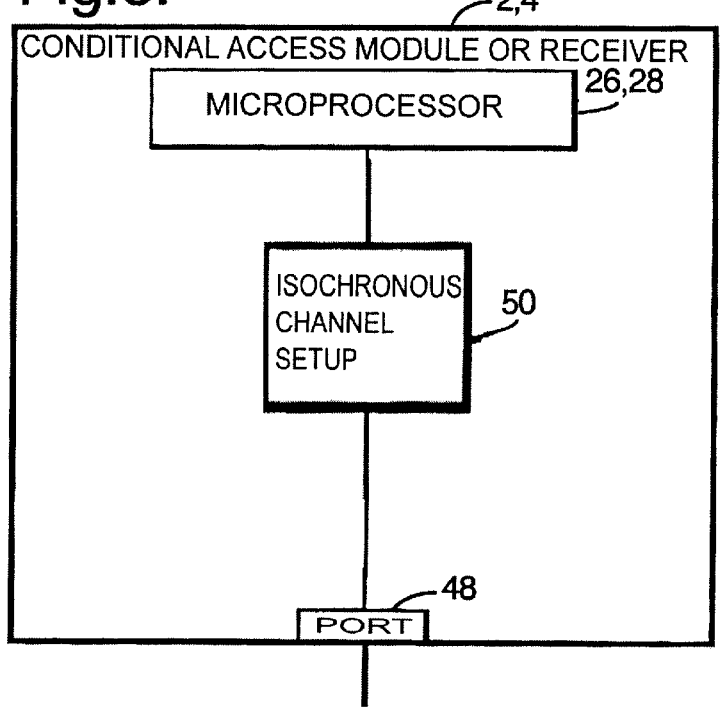
Fig. 8.

Fig.11(a).

| Table | 1 | 2 | 3 | 4 | 5 | 6 |

Fig.11(b).

| Stream | Contents |
|---|---|
| 1 | Channel D |
| 2 | Channel A |
| 3 | |
| 4 | Channel B |
| 5 | |
| 6 | Channel C |

DIGITAL MULTI-MEDIA DEVICE AND METHOD RELATING THERETO

BACKGROUND OF THE INVENTION

1. Field of the Invention

The present invention relates to a digital multi-media device such as a digital video device and an arrangement and method which allows the device to communicate with another device on a common bus.

2. Description of the Related Art

In the field of digital video processing, it is known to code digital video signals such that special processing is needed in the receiver to be able to reproduce the video signals. In particular, it has been proposed to provide a Conditional Access Module which can perform all of the descrambling and other conditional access functions of the digital TV receiver. This allows conditional access and signal decoding functions to be separated from a host receiver, such that a generic digital TV receiver can operate with many different conditional access systems in different Conditional Access Modules.

To allow communication between a Conditional Access Module and a digital TV receiver, a Common Interface has been proposed and standardized by CENELEC (EN50221 Common Interface Specification for Conditional Access and other Digital Video Broadcasting Decoder Applications). This standard Common Interface defines a transport stream interface in which various virtual channels are time multiplexed and a Command Interface over which various additional command data are sent. The Common Interface thus allows connection of a Conditional Access Module to a digital TV receiver or indeed any other digital video device.

As a basis for the present invention, it is now recognised that it would be advantageous to provide a Conditional Access Module on a local network of digital multi-media devices including audio and video devices, such that the various functions available in the Conditional Access Module can be provided to all of the devices on the network.

A standard has been proposed for connecting together various digital video devices on a local network. In particular, IEEE 1394 is a 1995 IEEE standard for a high performance serial bus and defines a bus, which will be referred to as an IEEE 1394 Serial Bus, for connecting together various digital consumer audio/visual products.

The IEEE 1394 specification defines a physical connector, electrical signalling and a set of link and transaction protocols allowing the serial bus to self configure and carry audio, video and control information efficiently.

A further set of additional protocols have also been defined to carry MPEG data and provide control mechanisms between different items of equipment on the IEEE 1394 Serial Bus. These protocols are defined in the specification "Digital Interface for Consumer Electronic Audio/Video Equipment" (IEC 1883).

The IEEE 1394 specification defines mechanisms and protocols to carry two types of data, namely asynchronous and isochronous data.

Asynchronous data generally has no requirements on the transport mechanism regarding time, for example the jitter imposed or the delay in transmission. This data can be used for instance for file data or general command and status data.

On the other hand, isochronous data has strong requirements for low jitter and a fixed or bounded delay for transmission and may be used for MPEG coded audio and video data.

OBJECTS AND SUMMARY OF THE INVENTION

In view of the developments with the IEEE 1394 Serial Bus, it is now considered to connect a Conditional Access Module to a number of different digital multi-media devices such as audio and/or video devices using the IEEE 1394 Serial Bus. Unfortunately, however there are significant problems in implementing such a system. IEEE 1394 related protocols have been developed that are intended for use with streams of single channel MPEG data and its own protocols are provided for various command data. In particular, the Conditional Access Common Interface and the IEEE 1394 serial bus have set different standards.

A first aspect of the present invention concerns the problem that, for the Common Interface, the transport stream sent to the Conditional Access Module includes all of the virtual channels and hence takes up a significant amount of the bandwidth available over the IEEE 1394 Serial Bus.

The first aspect of the present invention also deals with the problem that it is often not sufficient to send to a Conditional Access Module merely the virtual channel which it requires for descrambling, since other data in the transport stream may be required by the Conditional Access Module.

A second aspect of the present invention concerns implementing the Transport Stream Interface of the Common Interface over an IEEE 1394 Serial Bus so that the transport stream data of the interface may be communicated over the IEEE 1394 Serial Bus.

A third aspect of the present invention concerns implementing the Command Interface over the IEEE 1394 Serial Bus.

The fourth aspect of the present invention concerns implementing the Command Interface over the IEEE 1394 Serial Bus.

According to the first aspect of the present invention, there is provided a digital multi-media receiver comprising:
  an output for an IEEE 1394 Serial Bus for transmitting a transport stream to a Conditional Access Module on the bus;
  a reader for reading the contents of a transport stream and identifying data which is not required for processing by a Conditional Access Module;
  a stripper for stripping out at least some of the identified unrequired data from the transport stream; and
  a transmitter for transmitting through the output all of the remaining data of the transport stream which has not been stripped.

According to the first aspect of the present invention, there is also provided a network of digital multi-media devices connected by means of an IEEE 1394 Serial Bus, the network comprising:
  a device for transmitting a transport stream over the IEEE 1394 Serial Bus; and
  a second device for receiving a transport stream over the IEEE 1394 Serial Bus; wherein
  the first device includes a reader for reading the contents of a transport stream and identifying data which is not required for processing by the second device;
  a stripper for stripping out at least some of the identified unrequired data from the transport stream; and
  a transmitter for transmitting to the second device over the IEEE 1394 Serial Bus all of the remaining data of the transport stream which has not been stripped.

According to the first aspect of the present invention, there is also provided a method of transmitting a transport stream over an IEEE 1394 Serial Bus, comprising:

stripping out of the transport stream identifiable unrequired data so as to reduce the bandwidth of the transport stream.

Thus, since the only data to be stripped from the transport stream is that data which is positively identified as not being required by the Conditional Access Module, the stripped transport stream contains all of the data required by the Conditional Access Module. Furthermore, in practice, the stripper will be stripping out virtual channels containing broadcast program content data. The broadcast program content data takes up the most significant proportion of the bandwidth of the transport stream and, therefore, stripping out this data will have a very significant effect on reducing the overall bandwidth of the transport stream.

The present invention is applicable to any type of digital multi-media device, including devices handling audio data, video data, other multi-media data or a mixture thereof. It is particularly advantageous for digital video devices handling at least video data.

Preferably, the transport stream is an MPEG-2 transport stream and is transmitted in isochronous channels under the IEC1883 format.

A table of program specific information (PSI) is provided in the MPEG transport stream, such that unrequired parts of the transport stream can be identified for stripping.

The receiver is able to determine which streams to strip out not only from the PSI but also the user state, i.e. which program the user wishes to watch or record, etc. As receivers in general can only display one picture at a time then that is the one to be descrambled and all the others can be ignored.

According to the second aspect of the present invention there is provided a method of implementing a Common Interface Transport Stream Interface over an IEEE 1394 Serial Bus comprising:

setting up at least two isochronous channels over the IEEE 1394 Serial Bus with a Conditional Access Module;

transmitting a transport stream of the Transport Stream Interface over the first of said at least two isochronous channel to the Conditional Access Module; and receiving a transport stream of the Transport Stream Interface over a second of said at least two isochronous channels from the Conditional Access Module.

According to the second aspect of the present invention there is also provided a digital multi-media device comprising:

a port for an IEEE 1394 Serial Bus for communicating transport stream data of a Common Interface;

means for implementing the above method;

means for transmitting a transport stream over the first isochronous channel; and means for receiving a transport stream.

According to the second aspect of the present invention there is also provided a Conditional Access Module comprising:

a port for an IEEE 1394 Serial Bus for communicating transport stream data of the Common Interface of the Conditional Access Module;

means for setting up at least one isochronous channel over the IEEE 1394 Serial Bus with another device; and means for transmitting a transport stream over the isochronous channel.

The Conditional Access Module may further comprise means for responding to a or the another device to set up another isochronous channel on the IEEE 1394 Serial Bus and means for receiving transport stream data from the another isochronous channel over the IEEE 1394 Serial Bus.

According to the second aspect of the present invention there is also provided a Conditional Access Module comprising:

a port for an IEEE 1394 Serial Bus for communicating transport stream data of the Common Interface of the Conditional Access Module;

means for responding to another device to set up an isochronous channel on the IEEE 1394 Serial Bus; and means for receiving transport stream data from the isochronous channel over the IEEE 1394 Serial Bus.

Thus, in this way, it is possible for the full Transport Stream Interface to be formed over the IEEE 1394 Serial Bus and by using isochronous channels, the Common Interface may continue to send the transport stream data in its normal format without modification. Furthermore, a Conditional. Access Module may be provided which is capable of communicating transport stream data over the IEEE 1394 Serial Bus.

The transport stream on the second isochronous channel may be received by a second Conditional Access Module in which case a third isochronous channel may be set up over the IEEE 1394 Serial Bus with the second Conditional Access Module and a transport stream of the Transport Stream Interface may be received over the third isochronous channel from the second Conditional Access Module.

In this way, a transport stream can be passed consecutively from a host receiver to two Conditional Access Modules before being returned to the host receiver. This enables both Conditional Access Modules to perform different functions on the transport stream without the transport stream being passed back to the host receiver at an intermediate stage. This is advantageous over even the PC Card Implementation of the Common Interface. Of course, the method can be extended to include three or more Conditional Access Modules.

A third isochronous channel may also be set up over the IEEE 1394 Serial Bus to a remote device and the transport stream received from the Conditional Access Module may be re-routed to the remote device over the third isochronous channel.

In this way, a transport stream which has been sent from a host receiver can be re-routed to for instance a digital video recorder.

The transport stream on the second isochronous channel may be received by a remote device different from that from which the transport stream is transmitted to the Conditional Access Module.

In this way, where a transport stream is sent from a host receiver to the Conditional Access Module for processing and subsequently recording on a digital video recorder, the processed transport stream may be sent directly to the digital video recorder. This is advantageous over the PC Card Implementation of the Common Interface where a transport stream is returned to the sender.

An additional connection may be set up to the second isochronous channel with a remote device on the IEEE 1394 Serial Bus, such that the transport stream on the second isochronous channel is received additionally by the remote device.

In this way, a transport stream processed by the Conditional Access Module may be passed to more than one device without the need of any of those devices to re-route data and without taking up the additional band width required for an additional isochronous channel.

Digital multi-media devices to which the present invention may be applied include devices handling audio data, video data, other multi-media data or a mixture thereof. It may be applied particularly advantageously to digital video devices handling at least video data.

Thus, by virtue of the present invention, it is possible to preserve the higher layers of the existing DVB Common Interface as defined in EN50221, to make use of existing protocols developed for the IEEE 1394 Serial Bus, to ensure operation alongside existing products designed for use with the IEEE 1394 Bus, to ensure that the implementation allows further expansion to the DVB Common Interface standard to provide mechanisms to take advantage of the networked architecture of the IEEE 1394 Serial Bus and to ensure any extensions required to the DVB Common Interface will still be compatible with the present specification.

According to the third aspect of the present invention there is provided a method of implementing a Common Interface Command Interface over an IEEE 1394 Serial Bus comprising:

opening at least one isochronous channel over the IEEE 1394 Serial Bus; and transmitting command data of the Command Interface over the isochronous channel.

According to the third aspect of the present invention there is provided a digital multi-media device comprising:

a port for an IEEE 1394 Serial Bus for communicating command data of a Command Interface;

means for setting up at least one isochronous channel between the port and a remote device connected to the IEEE 1394 Serial Bus; and means for transmitting and/or receiving command data of the Command Interface over the isochronous channel.

The device may further comprise means for responding to the or a remote device on the IEEE 1394 Serial Bus to set up at least one isochronous channel with said the or a remote device and means for transmitting and/or receiving command data of a Command Interface of said the or a remote device from the isochronous channel.

According to the third aspect of the present invention there is also provided a digital multi-media device comprising:

a port for an IEEE 1394 Serial Bus for communicating command data of a command interface;

means for responding to a remote device on the IEEE 1394 Serial Bus to set up at least one isochronous channel between the port and said remote device; and means for transmitting and/or receiving command data of a Command Interface of the remote device from the isochronous channel.

In this way, once an isochronous channel is opened on the IEEE 1394 Serial Bus, there are no particular protocol requirements for the data transmitted over that channel. Therefore, the Command Interface can transmit and receive command data over the set up isochronous channel without any need to modify the nature of the command data in accordance with the protocols used for the IEEE 1394 Serial Bus.

Preferably, at least two isochronous channels are set up between the port and the remote device to enable communication in both directions.

The present invention is applicable to any digital multi-media device including devices handling audio data, video data, other multi-media data or a mixture thereof. It is particularly advantageous for digital video devices handling at least video data.

Preferably, the various devices may be Conditional Access Modules, digital video receivers or other digital video devices.

In this way, devices connected to the IEEE 1394 Serial Bus may all make use of the functions of the Conditional Access Module.

In order to vary the bandwidth available for the command data, the host receiver or module that requires the extra bandwidth may contact the isochronous resource manager and request the extra bandwidth for this channel using IEEE 1394 protocols.

Preferably, a Common Interface IEEE 1394 Specific Transport Layer is provided between the Generic Transport Layer of the Common Interface and an IEC1883 Implementation Link Layer.

In this way, the Generic Transport Layer of the Common Interface may continue to operate in the same manner as proposed for the PC Card implementation with the lower different layers being transparent to it. The Common Interface IEEE 1394 Specific Transport Layer and the IEC1883 Implementation Link Layer act to set up the appropriate isochronous channels without any need for modification of the Common Interface.

Thus, by virtue of the present invention, it is possible to preserve the higher layers of the existing DVB Common Interface as defined in EN50221, to make use of existing protocols developed for the IEEE 1394 Serial Bus, to ensure operation alongside existing products designed for use with the IEEE 1394 Bus, to ensure that the implementation allows further expansion to the DVB Common Interface standard to provide mechanisms to take advantage of the networked architecture of the IEEE 1394 Serial Bus and to ensure any extensions required to the DVB Common Interface will still be compatible with the present specification.

According to the fourth aspect of the present invention, there is provided a method of implementing a Common Interface Command Interface over an IEEE 1394 Serial Bus comprising:

extending AV/C-CTS Protocols used for communication over the bus to include opcodes corresponding to transport objects of the Command Interface.

According to the fourth aspect of the present invention, there is also provided a digital multi-media device comprising:

a port for an IEEE 1394 Serial Bus for communicating command data of a Command Interface;

a coder for converting transport objects of the Command Interface into AV/C-CTS opcodes;

a transmitter for transmitting the AV/C-CTS opcodes through the port.

The digital multi-media device may further comprise a receiver for receiving AV/C-CTS opcodes through the port and a decoder for converting appropriate AV/C-CTS opcodes into corresponding transport objects of the Command Interface.

According to the fourth aspect of the present invention, there is also provided a digital multi-media device comprising:

a port for an IEEE 1394 Serial Bus for communicating command data of a Command Interface;

a receiver for receiving AV/C-CTS opcodes through the port; and a decoder for converting appropriate AV/C-CTS opcodes into corresponding transport objects of the Command Interface.

In this way, the Command Interface is able to function as previously intended without modification, but can operate over the IEEE 1394 Serial Bus. Furthermore, operation of the IEEE 1394 Serial Bus is not significantly altered, since the AV/C-CTS Protocols are already in accordance with the IEEE 1394 Serial Bus and an extension of their command set will not interfere with operation, but only extend it.

Preferably, a Conditional Access Module is constructed according to the invention.

In this way, the functions of the Conditional Access Module will be available to many devices on the IEEE 1394 Serial Bus. Furthermore, the Conditional Access Module can be located in any suitable position and take any suitable form.

The present invention is applicable to any digital multimedia device including devices handling audio data, video data, other multi-media data or a mixture thereof. It is particularly advantageous for digital video devices handling at least video data.

Preferably, the eleven transport objects of the Command Interface have eleven corresponding AV/C-CTS opcodes.

In this way, each of the eleven transport objects are uniquely defined by a respective AV/C-CTS opcode, such that no further distinction need be made upon receipt of an AV/C-CTS opcode relating to the Command Interface.

Preferably, the objects of the Command Interface are encoded within the payload of the AV/C-CTS opcodes using a PC Card Implementation Transport Layer syntax.

Preferably, the AV/C-CTS opcodes are included in the header of AV/C-CTS commands and the objects of the Command Interface are encoded within the payload of the AV/C-CTS commands using a syntax at least based on the PC Card Implementation Transport Layer.

In this way, the Generic Transport Layer of the Command Interface need only consider lower functional layers in the same way as was intended for the PC Card Implementation.

Preferably, the Generic Transport Layer of the Command Interface is supported by a Common Interface IEEE 1394 specific transport layer, in turn supported by an AV/C-CTS Implementation Link Layer providing the AV/C-CTS Protocols.

In this way, the Common Interface IEEE 1394 Specific Transport Layer replaces the PC Card Implementation Transport Layer previously used, such that the Generic Transport Layer is transferred to the AV/C-CTS Implementation Link Layer with no knowledge required of its existence.

Thus, by virtue of the present invention, it is possible to preserve the higher layers of the existing DVB Common Interface as defined in EN50221, to make use of existing protocols developed for the IEEE 1394 Serial Bus, to ensure operation alongside existing products designed for use with the IEEE 1394 Bus, to ensure that the implementation allows further expansion to the DVB Common Interface standard to provide mechanisms to take advantage of the networked architecture of the IEEE 1394 Serial Bus and to ensure any extensions required to the DVB Common Interface will still be compatible with the present specification.

BRIEF DESCRIPTION OF THE DRAWINGS

FIG. 7 illustrates a DVB Common Interface IEEE 1394 implementation protocol stack;

FIG. 8 illustrates a device for implementing a Common Interface Command Interface over an IEEE 1394 Serial Bus;

FIGS. 11(a) and (b) illustrate a transport stream and associated table.

DETAILED DESCRIPTION OF THE PREFERRED EMBODIMENTS

The invention will be more clearly understood from the following description, given by way of example only, with reference to the accompanying drawings.

Figure 1:
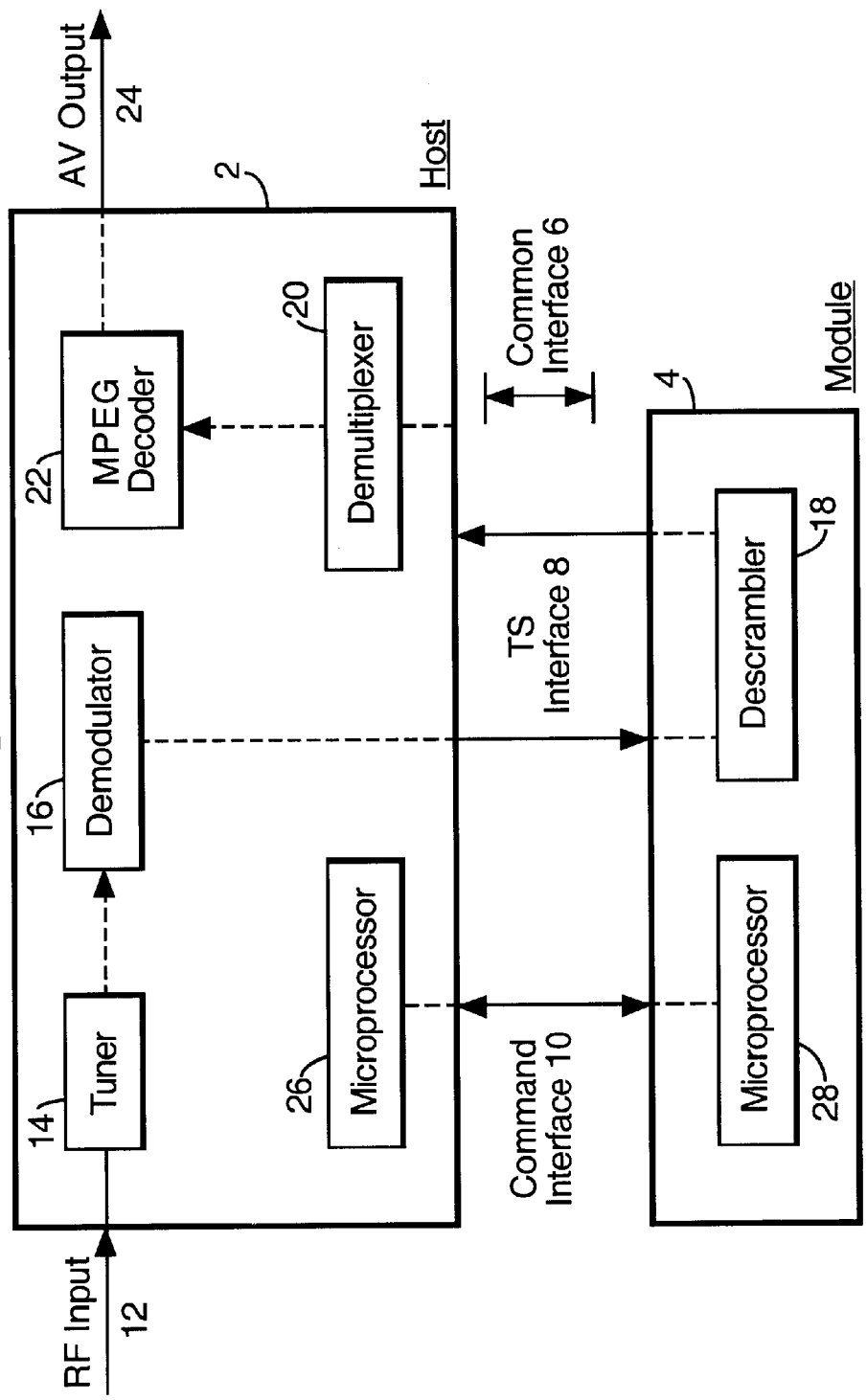
FIG. 1 illustrates a DVB Common Interface architecture.

As mentioned above, a standard has already been specified for a Common Interface for a Conditional Access Module. FIG. 1 illustrates the architecture of this standard.

As illustrated, a receiver or host 2 is connected to a Common Interface Module such as a Conditional Access Module 4 by means of the Common Interface 6.

Other types of Common Interface Module might include RF input front ends for receiving, for instance, satellite transmissions, audio decoders for "Auditel" scene description for the visually impaired, audience metering modules, etc.

The DVB (Digital Video Broadcast) Common Interface specification currently defines the physical layer of the common interface to conform to the PC card standard as specified by the PCMCIA. In other words, physically the connection forming the Common Interface comprises a 68-way connector with the standard PC card arrangement as used in many personal computers today. However, the DVB Common Interface has been designed with a layered architecture to allow new physical layers (for example the smart card form factor) to be used with the same upper layer protocols. In other words, the processing conducted on either side of the physical connection has been designed such that different physical arrangements can be used for the connection without changing the way in which the standardized processing operates.

As illustrated in FIG. 1, the DVB Common Interface includes two main parts, namely a transport stream interface 8 and a command interface 10.

The transport interface 8 is used to transfer a transport stream from the receiver or host 2 to the module 4 and back to the receiver 2. In particular, the receiver 2 receives an RF input 12, a particular band is selected using a tuner 14 and this band is demodulated in the demodulator 16. The output of the demodulator 16 comprises a transport stream including time multiplexed virtual channels. These are transmitted over the transport stream interface 8 to a descrambler 18 in the module 4. The descrambler 18 identifies those virtual channels for which it is intended and sends back to the receiver 2, over the transport stream interface 8, a transport stream in which selected virtual channels have been descrambled. In the receiver 2, a demultiplexer 20 selects a required virtual channel and passes MPEG packets relating to that virtual channel to an MPEG decoder 22 which, in turn, outputs an audio/video output 24.

The second part of the DVB Common Interface is the command interface 10. This provides a high level protocol allowing the host receiver 2 and the module 4 to communicate and, furthermore, for Applications in either the host receiver 2 or module 4 to access Resources across the interface. In particular, standardized codes and data formats are provided for communication over the Command Interface.

A microprocessor 26 of the host receiver 2 and a microprocessor 28 of the module 4 can communicate using the Command Interface. Furthermore, the overall system may include a MODEM, a graphics generator, etc and the Command Interface can be used to transfer control information to these devices also. As an example, the module 4 may wish to communicate with a remote control centre via a MODEM for details of subscription fees and then control a TV display to indicate messages according to the subscription status. This communication can be achieved by means of the Command Interface 10.

Figure 2A:
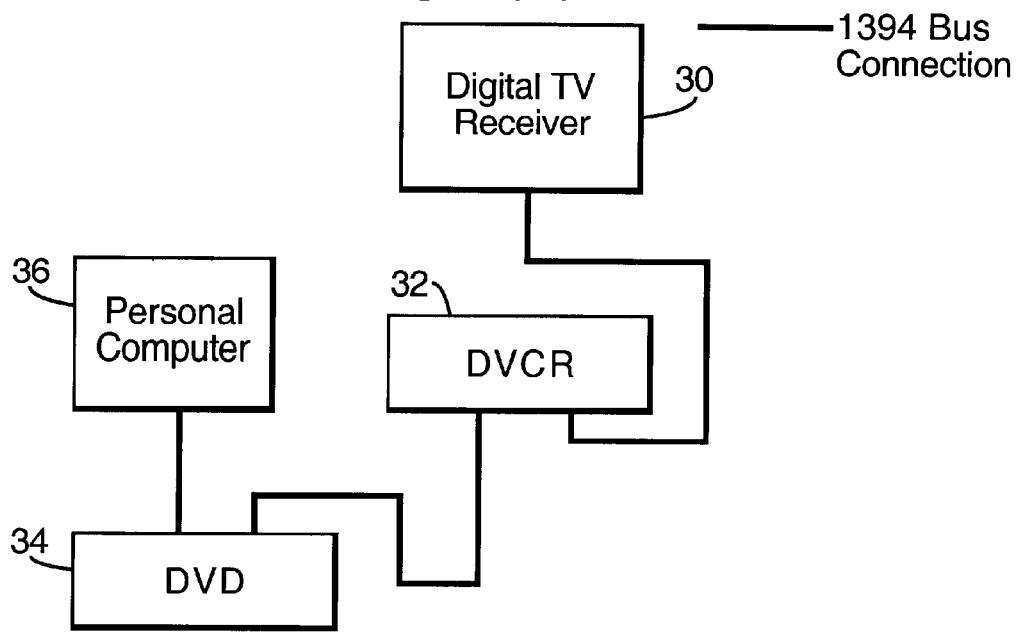
FIG. 2(a) illustrates a network of digital multimedia devices.

As mentioned above, it has been proposed to link various digital video devices together using an IEEE 1394 Serial Bus. FIG. 2a illustrates a network in which a digital TV receiver 30 is connected to a digital video recorder 32, in turn connected to a digital video disk machine 34, in turn connected to a personal computer 36.

The IEEE 1394 bus is a serial bus that allows a low cost mechanism to transmit audio, video and control information between equipment. It is very well suited to consumer audio/visual applications and is expected to become widely used for many new digital consumer audio/visual products. It is particularly attractive in that it offers a "plug and play" operation. In other words, an additional device may be connected into the network without any special reconfiguring of the network and protocols are included whereby devices on the network automatically determine what other devices are present.

The IEEE 1394 Trade Association is an industry grouping that brings together all of the interested industry parties for the IEEE 1394 Serial Bus. This Trade Association has worked to define a set of protocols which offer a set of commands to be carried over the IEEE 1394 Serial Bus in the format of the IEC 1883 Function Control Protocol (FCP) mentioned above. The set of commands are known as Audio/Video Control-Command Transactions (AV/C-CTS) and are specified in the AV/C digital Interface Command Set Document developed by the IEEE 1394 Trade Association (see AV/C Digital Interface Command Set Version 2.0D Mar. 26, 1997 Audio/Video Working Group of the IEEE 1394 Trade Association). The AV/C-CTS provides general set-up and control commands and sets of commands specifically for a digital VCR and tuner. They are encoded using a header and a payload. The header contains information such as the destination address and the opcode specifying the function of the command. Further operands of the commands are carried in the payload of the command.

Figure 3:
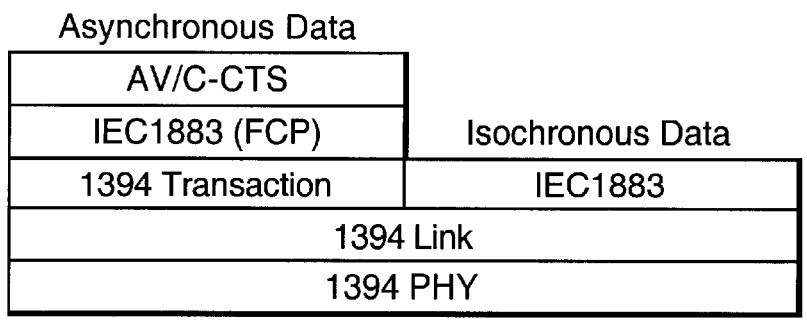
FIG. 3 illustrates an IEEE 1394 protocol stack.

Thus, the communication of data over the IEEE 1394 Serial Bus may be considered as a layered structure, with the protocol stack, formed of the various protocol layers, being illustrated in FIG. 3.

For command information, for instance instructing a video recorder to start replaying a video signal, data is sent as asynchronous data over the IEEE 1394 Serial Bus. This is illustrated in the left hand side of the protocol stack of FIG. 3.

The commands are sent using the AV/C-CTS protocol, with a particular AV/C-CTS command having a header which is specific to its destination unit, for instance a video recorder, and indicating the basic required function, for instance replay of a video tape. In particular, the AV/C-CTS header specifies fields for command type (eg. control, status, inquiry, notify, etc), subunit type and subunit identifier, such that it defines the destination subunit for a command AV/C frame and the source subunit for a response AV/C frame. In this way, the AV/C-CTS works with a command/response scheme with a first subunit sending a command AV/C frame to a second subunit and the second subunit responding back with a response AV/C frame.

The opcode for the command is also specified in the header so as to indicate the basic function. The payload may be arranged to specify other operands or additional information, for instance indicating that play should occur at a certain speed, such as slow forward, fast forward, fastest forward.

The protocol layer of the AV/C-CTS has been designed to conform to the protocol layer beneath it, the IEC 1883 Function Control Protocol. This is a particular protocol for addressing a node (a unit on the network) with attached data. Thus, in this case, the IEC 1883 FCP would function to transmit the AV/C-CTS as the attached data.

AV/C-CTS protocols are a specific command set implementation of FCP. The AV/C-CTS commands are encoded using an FCP frame, the header of which specifies the IEEE 1394 node (device) destination and source addresses, frame data length, CRC and other information. In particular, the first four bits of the FCP frame payload make a field which specifies the command set being carried by the FCP frame. The FCP frame header carries a value of "0" in this field to indicate that it is carrying an AV/C-CTS command. Command sets other than AV/C-CTS could be carried by the FCP frame using different values in this field. The rest of the FCP frame payload contains the AV/C header and payload.

The protocol layers defined in the IEEE 1394 specification include a IEEE 1394 transaction layer which handles delivery and acknowledgement data for the data and a IEEE 1394 link layer which provides the various data links to the various units. Finally, the lowest layer is the IEEE 1394 physical layer comprising the physical connections.

The transaction layer provides a set of services to applications running in devices on the IEEE 1394 bus, in particular for asynchronous data only. These are services such as read and write and enable devices to access other devices on the bus by specifying a node id of the device and address within that node. The services are designed to provide reads and writes and provide acknowledgements back to the requester. The transaction layer also provides "lock" services. These are defined as "atomic" operations, meaning the operations are indivisible in time, so that for instance a "test and set" operation from one device on another does not get interrupted half way through by another device modifying the same location. This is very important for a peer-to-peer bus such as IEEE 1394 where many devices can access each other with equal priority.

The link layer provides the packetisation of the asynchronous and isochronous data. The link layer also provides cycle control which allows isochronous data to be carried with low latency and bounded jitter.

The lowest layer is the physical layer (or PHY layer in IEEE 1394 terminology). This provides the low level electrical signalling and encoding of the data bits to be transmitted and received. The PHY layer provides the low-level arbitration between devices on the bus so that only one device is driving the bus at a time. The PHY layer also defines the connector and the required characteristics for the cable media.

The protocol layers for isochronous data, such as MPEG data, are illustrated on the right hand side of FIG. 3.

The isochronous data is transmitted according to the IEC 1883 protocol layer. This is supported directly by the IEEE 1394 link layer, which sets up the various connections with the IEEE 1394 physical layer. In particular, the IEC 1883 protocol layer sets up an isochronous channel between two devices on the bus.

The IEEE 1394 specification defines the lower layers for the carriage of isochronous data, these being the physical and link layers as described above. The IEC 1883 protocols provide mechanisms to allow the efficient transport of AV data utilising a Common Isochronous Packet (CIP) header. This allows AV data packets to be split up for transport over the IEEE 1394 bus and also has fields to signal data format (standard or high definition video data, 50 or 60 Hz field rate). The IEC 1883 specification also provides the concept of logical channels and plugs for the carriage and connection of AV data between devices on the IEEE 1394 bus.

In this way, the IEEE 1394 Serial Bus and its related protocols provide a mechanism for audio/video peripherals to communicate command and control information, together with digital audio/video data.

As a basis for the present invention, it is proposed that a Common Interface Module such as a Conditional Access Module could also be connected to a network of digital video devices using an IEEE 1394 Serial Bus.

Figure 2B:
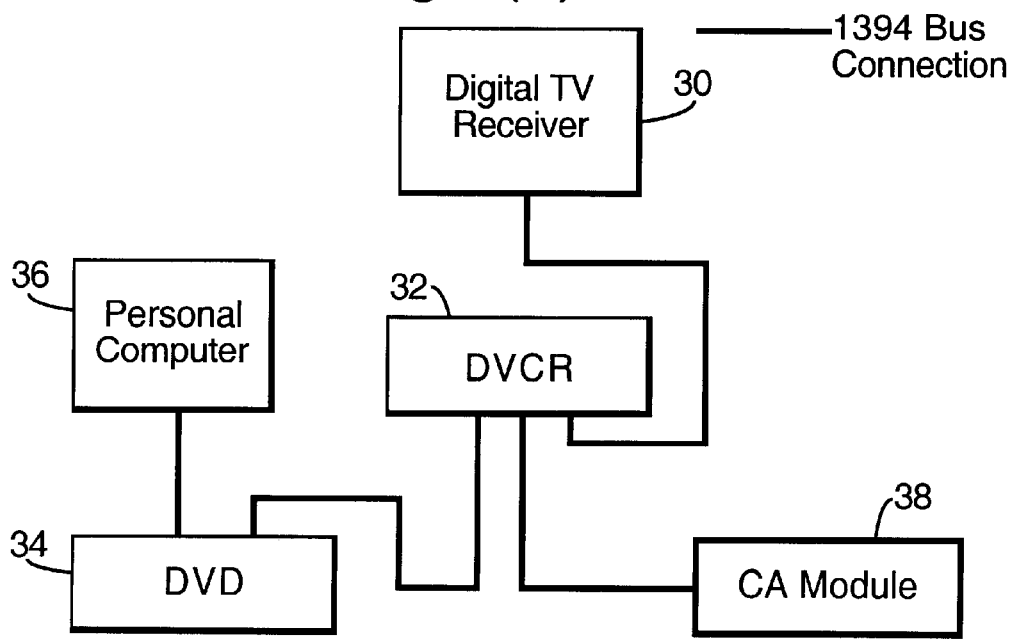
FIG. 2(b) illustrates a network of digital devices with a Conditional Access Module.

FIG. 2b illustrates the network of FIG. 2a, but further including a Conditional Access Module 38. This arrangement has a number of significant advantages over using the previously proposed PC card implementation of the DVB Common Interface.

With the Conditional Access Module provided on the network, the conditional access functions can be used equally by every peripheral. Furthermore, no particular peripheral has to provide power to the Module or has to act as a protocol bridge through which the Module communicates with the rest of the network.

Since the module on the network need not be closely physically bound to any particular receiver, there is more flexibility in the physical form and positioning of it. In other words, whereas previously a Conditional Access Module might be connected to the back of a receiver or video recorder, a network allows the module to be placed in any convenient position and in any convenient form.

Finally, even if conditional access functions are embedded in a particular device, such as a receiver, rather than in a separate Conditional Access Module, the network makes it possible for other devices to make use of the embedded conditional access functions.

Figure 4:
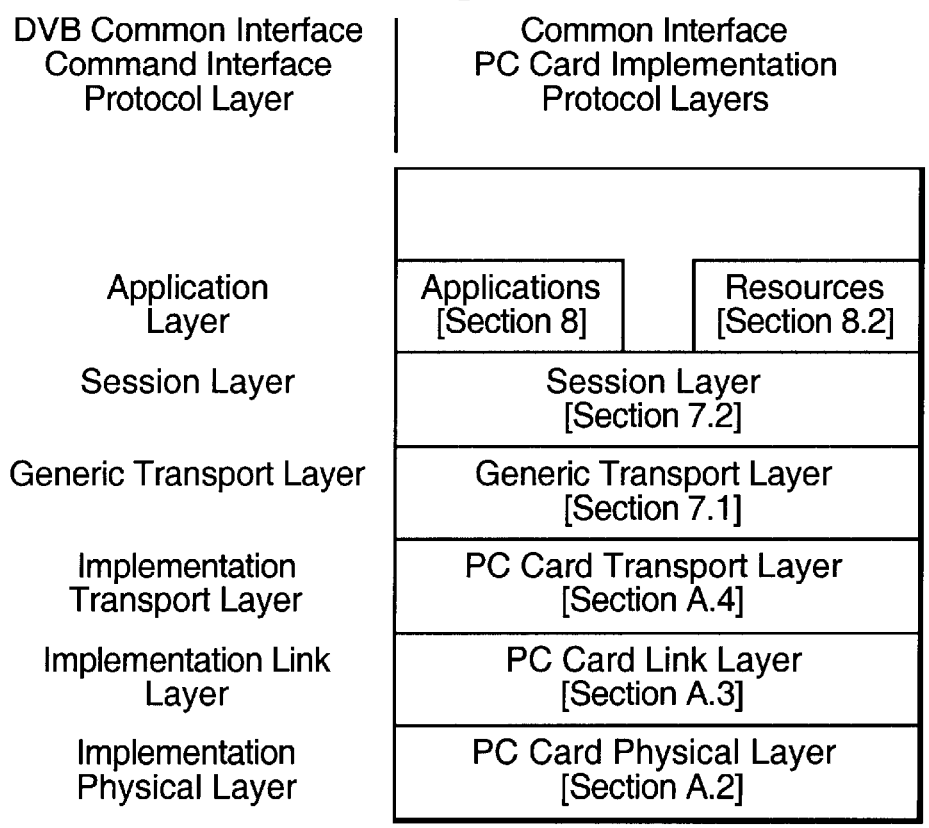
FIG. 4 illustrates a DVB Common Interface PC card implementation protocol stack.

FIG. 4 illustrates the various protocol layers forming the protocol stack for the Command Interface of a Common Interface as implemented in a PC card format. The various sections of the Common Interface standards document EN50221 mentioned above are also given in this figure.

At the highest layer, the Application Layer, the various Applications and Resources are provided.

Below this is the Session Layer. Thus, when a particular device has an application requiring the use of a resource, it sets up a session by means of the Session Layer with another Resource.

The process utilises each of the layers down to the lowest physical layer. From the lowest physical layer, all the various layers are then utilised up to the Resource of the other device. In other words, the data is transmitted between the resource and application by processing the data down from the application through each layer to the physical layer where it is then processed back up to the resource. The data can then return in a similar way from the resource back to the application.

In general, lower layers are transparent to the upper layers, such that when an Application requires a session with a Resource, it is not aware of how the Session Layer or lower layers achieve that session.

The lowest generic layer of the DVB Common Interface is the Generic Transport Layer. This layer provides a set of eleven transport objects that are used to control the creation and deletion of transport connections and carry data over these transport connections.

Below the Generic Transport Layer, the PC card transport layer actually sets up the transmission of data to be suitable for transmission over the PC Card defined electrical/physical interface. Thus, since lower layers are transparent, it is not important to the Generic Transport Layer how further communication of data takes place. In particular, it is not important to the Generic Transport Layer whether the PC card format is used.

Figure 5:
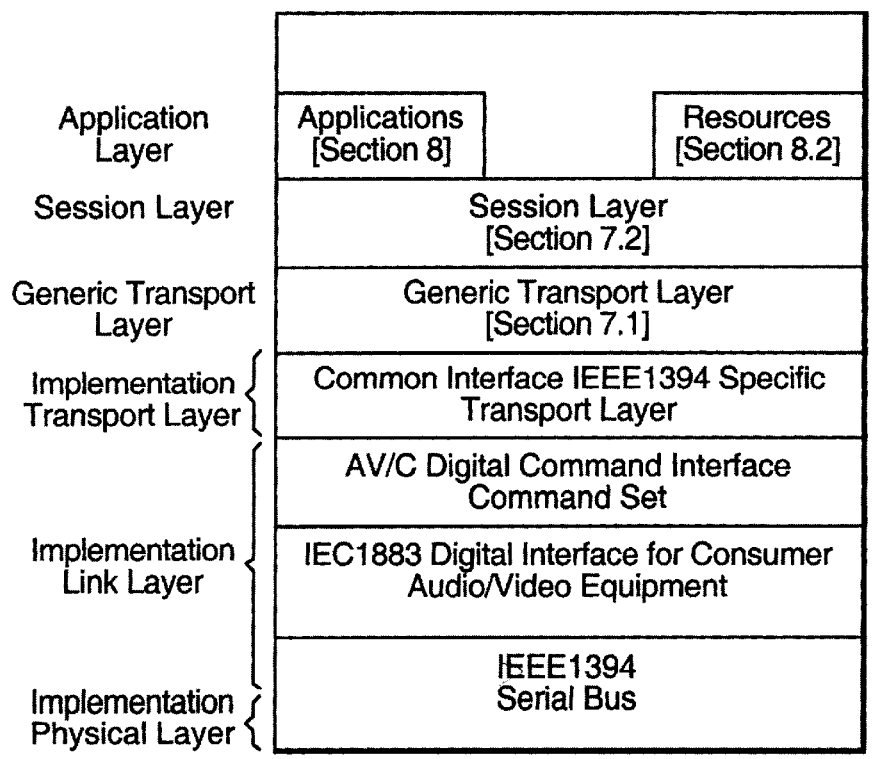
FIG. 5 illustrates a DVB Common Interface IEEE 1394 implementation protocol stack.

With reference to FIG. 5, a solution is proposed to the problem of providing the Command Interface on the IEEE 1394 Serial Bus.

This solution is based on sending the command data of the Command Interface by means of asynchronous data on the IEEE 1394 Serial Bus and proposes that the AV/C-CTS protocols be extended to carry the command data.

As illustrated in FIG. 5, the PC card transport layer which previously handles the higher Generic Transport Layer is replaced by a Common Interface IEEE 1394 Specific Transport Layer.

As mentioned above, the lower layers are transparent to the Generic Transport Layer. Therefore, the Generic Transport Layer and higher layers need not be aware of the different Specific Transport Layer and the functioning of the standard Command Interface is not changed.

Commands are produced in the Generic Transport Layer in the same way as before. However, these are then handled by the Common Interface IEEE 1394 specific Transport Layer in accordance with the IEEE 1394 arrangement rather than the PC card arrangement.

The extended AV/C-CTS protocols provide a mechanism for carrying the command interface protocols. In effect, the AV/C-CTS protocols carry the newly defined Common Interface IEEE 1394 Specific Transport Layer.

The proposed extensions to the AV/C-CTS protocols are as follows. The eleven objects of the Command Interface are each given an AV/C-CTS opcode, such that there is a separate AV/C-CTS command for each one of the eleven objects of the Command Interface. The object of the Command Interface can then be encoded within the payload of the AV/C-CTS command using a similar syntax as is used in the PC Card Implementation.

The AV/C-CTS protocol may be extended to cover other peripherals defined as "sub-unit types" and the Conditional Access Module can be defined as a new sub-unit type. In this way, each of the eleven new AV/C-CTS opcodes will be recognised as being intended for a Conditional Access Module, in contrast to opcodes intended for the TV receiver, video recorder, etc.

In this way, the Command Interface can continue to function in the same way as previously defined for the PC Card Implementation. There is no need for modification of the upper layers or, indeed, any awareness of the means of the lower layer communication. Similarly, communication of the command interface data is achieved using the standards already defined for the IEEE 1394 Serial Bus, such that no modifications are required to these standards.

Thus, it is possible to provide a Conditional Access Module which operates over the IEEE 1394 Serial Bus, merely by providing additional AV/C-CTS opcodes corresponding to transport objects of the Command Interface.

Figure 6:
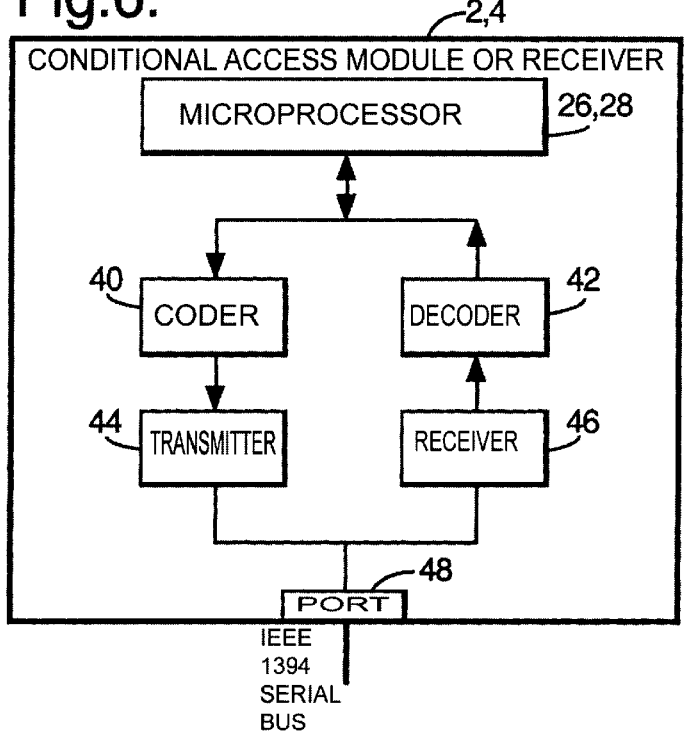
FIG. 6 illustrates schematically a device for implementing a Common Interface Command Interface over an IEEE 1394 Serial Bus.

FIG. 6 illustrates schematically a device such as a host receiver 2 or Conditional Access Module 4 implementing a Command Interface over an IEEE 1394 Serial Bus.

A microprocessor 26,28 can continue to produce and receive command data in the normal way. However, additional functional blocks, namely a coder 40 and a decoder 42, are provided to convert the data according to the extended AV/C-CTS protocols.

The coder 40 produces appropriate AV/C-CTS commands with headers including appropriate ones of the eleven opcodes corresponding to the eleven objects of the Command Interface. Objects of the Command Interface can then also be included in the payloads of the AV/C-CTS commands using a syntax similar to the PC Card Implementation syntax.

The decoder 42 on the other hand produces appropriate Command Interface objects from the opcodes and payloads of the received AV/C-CTS commands.

A transmitter 44 is provided to transmit the AV/C-CTS commands, for instance under the IEC 1883 protocol, via a port 48.

A receiver 46 receives AV/C-CTS commands from the port 48 and distinguishes appropriate AV/C-CTS commands by identifying ones of the eleven new Common Interface type opcodes as opposed to opcodes used for other units.

FIG. 7 illustrates an alternative solution to the problem of communicating Command Interface data over the IEEE 1394 Serial Bus.

In particular, it is proposed to use an isochronous channel to carry the Command Interface data. This has the advantage of being able to guarantee a bandwidth for DVB Common Interface Command Interface data, which is very useful when running applications that require a fast response and low delay, eg. graphics. It is proposed that, upon initialization, two isochronous channels would be created, one running from the host to the module and the other from the module to the host.

By comparing FIGS. 4 and 7, it will be seen that the implementation transport layer of FIG. 7, namely the PC card transport layer, has been replaced by a common interface IEEE 1394 specific transport layer.

Since lower layers are transparent to the Generic Transport Layer, replacement of the PC card transport layer will have no effect on the Generic Transport Layer and the Common Interface IEEE 1394 Specific Transport Layer will merely handle the data of the Generic Transport Layer in a manner suitable for the IEEE 1394 Serial Bus. Thus, when a session is required to communicate Command Interface data between an Application and a Resource, the common interface IEEE 1394 specific transport layer and IEC 1883 implementation link layer operate together to set up two isochronous channels over which the command data may be transmitted.

FIG. 8 illustrates schematically a device such as a host receiver 2 or a module 4 with a corresponding microprocessor 26 or 28.

As illustrated, an additional functional block 50 is provided. This communicates with other devices over the IEEE 1394 Serial Bus, for instance by means of the IEC 1883 protocol, to set up isochronous channels. The command data of the Command Interface may then be sent or received over an appropriate channel.

Once the isochronous transmission channels are set up, there is no need for acknowledgements and such like. Therefore, the IEEE 1394 Serial Bus side of the interface need not have a knowledge or require any modification in view of the Command Interface data being transmitted. Preferably, however, this implementation can include features of that discussed above. In particular, the AV/C-CTS protocol may nevertheless be extended so as to define a Conditional Access Module as another sub-unit type in addition to previous units such as the receiver and video recorder. This will allow increased inter-operability with other devices on the IEEE 1394 Serial Bus, in particular allowing the Conditional Access Module to be identified by other peripherals on the IEEE 1394 Serial Bus.

The transport objects of the Command Interface consist of objects used for transport connection creation and deletion and objects used to carry the data for upper protocol layers. The control related objects can be encoded as AV/C-CTS commands, either each in separate AV/C-CTS commands or in one generic AV/C-CTS command.

The objects used for data carriage could then be used to carry the data to and from the module on the isochronous channels.

In other words, the generic transport layer defines eleven objects—these can be separated into two sets. One set is used for connection management, setting up and closing down transport connections. The other set is used for data carriage over an existing transport connection previously set up using the other transport objects. Generally transport connections are set up infrequently and the most heavily used transport objects are those used to carry data.

Use of the isochronous channel guarantees bandwidth for applications. Hence, the transport objects used most on the isochronous channel would be transport objects carrying data; not setting up connections etc. Hence, the connection management transport objects could be still carried as AV/C-CTS commands as previously discussed and it would not affect the efficiency of the scheme much. Since a layered scheme is used, the generic transport layer need not be aware of whether the objects were carried as asynchronous or isochronous data. The connection management transport objects can be considered to be more suitable to be carried as AV/C-CTS commands.

On the other hand, all eleven of the transport objects of the command interface could be encoded in the same way as with the current DVB common interface specification and then carried in the IEEE 1394 isochronous channels. This avoids the use of the AV/C command set, since this is only required for use with the asynchronous data.

A disadvantage of using an isochronous channel for the Command Interface is that bandwidth allocated to the Command Interface will be wasted if it does not completely fill the isochronous channels provided. In particular, bandwidth allocated for intensive applications will be wasted when those applications are not active.

It would be possible to allocate the bandwidth of the required isochronous channels dynamically, depending on how much the applications require at any one time. In particular, a host and module could initialize to a default low value bandwidth for the Command Interface isochronous channels and then request allocation of more bandwidth if an application requires a faster response. In particular, the device (host or module) requiring the extra bandwidth can contact the isochronous resource manager and request the extra bandwidth required. If available the bandwidth can then be allocated to that device. Bandwidth can be given up in the same way. The device requesting the bandwidth can then output on the existing isochronous channel using the extra bandwidth and over the existing connection.

The isochronous resource manager is a device required on the bus if isochronous channels are to be allowed. Several devices could be isochronous resource manager capable and will arbitrate to allow one device to become the isochronous resource manager.

In order for a Conditional Access Module to be put on an IEEE 1394 Serial Bus network as mentioned above, it is also necessary for transport streams to flow to and from the Conditional Access Module.

The DVB Common Interface PC card implementation carries the transport streams using dedicated electrical connections on the host and module connectors. The IEEE 1394 Serial Bus provides no such physical connection, but only a set of isochronous channels providing logical connections between host and module. Therefore, a connection protocol needs to be defined to allow transport stream connections to be made between host and module.

The IEC 1883 implementations regarding Serial Bus management are compliant with the IEEE 1394 Interface Standard. According to these implementations and standards, an item of equipment, known as a node, connected to the IEEE 1394 through an interface board shall be cycle master capable. In other words, a cycle master unit is provided to control the timing of the isochronous channels used by all the nodes on the IEEE 1394 Serial Bus. Each node is also isochronous resource manager capable, such that an isochronous resource manager can control the allocation of isochronous resources to nodes on the IEEE 1394 Serial Bus. In other words, the resource manager can set up particular isochronous channels between particular nodes. Finally, a node which is transmitting or receiving isochronous packets shall provide plug control registers which themselves are used to set up and control audio/visual connections between nodes on the IEEE 1394 Serial Bus.

The protocols described in the IEC 1883 Standard provide a method of controlling isochronous data flow between devices connected using the IEEE 1394 Serial Bus.

According to this standard, devices have input and output plugs for transmitting and receiving isochronous data flows. Each plug can only carry one isochronous data flow and that isochronous data flow is carried in one isochronous channel which itself can carry only one isochronous data flow.

A connection is made between two plugs and defines the isochronous channel number and the bandwidth required.

Connections can be overlaid on one plug to allow an isochronous data flow to be connected to more than one destination plug. In this case, although there is more than one connection, there is still only one isochronous channel carrying the data flow.

Figure 9:
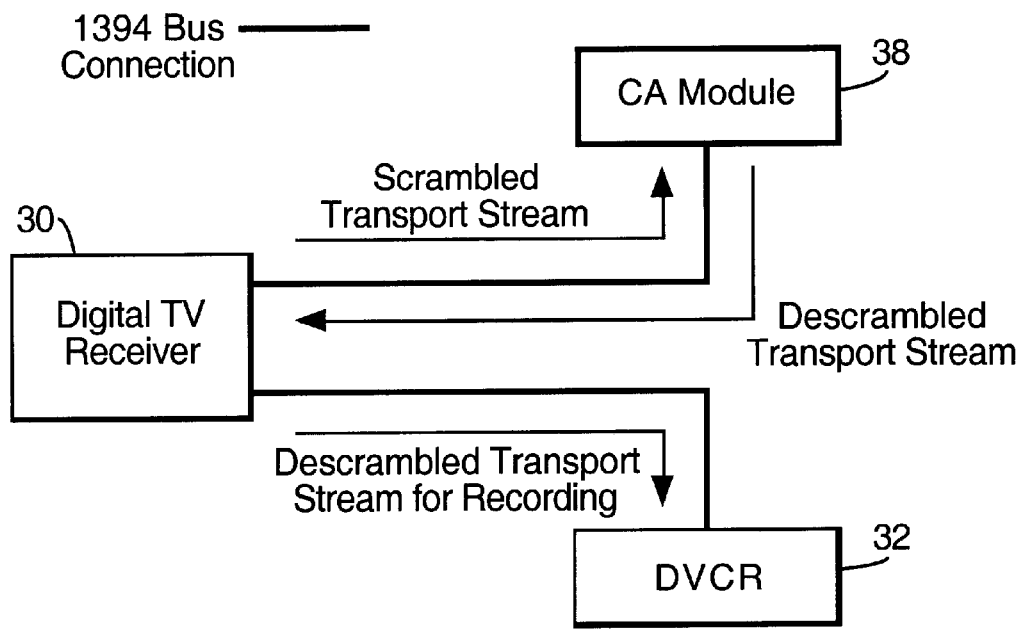
FIG. 9 illustrates a Common Interface configuration using an IEEE 1394 Serial Bus.

FIG. 9 illustrates a possible configuration where a Conditional Access Module 38 is connected on an IEEE 1394 Serial Bus.

Thus, it is proposed to use isochronous channels to carry the MPEG transport streams. In particular, it is proposed that isochronous channels will use IEC 1883 protocols to carry the MPEG transport stream using the common isochronous packet (CIP) header described above.

Figure 10:
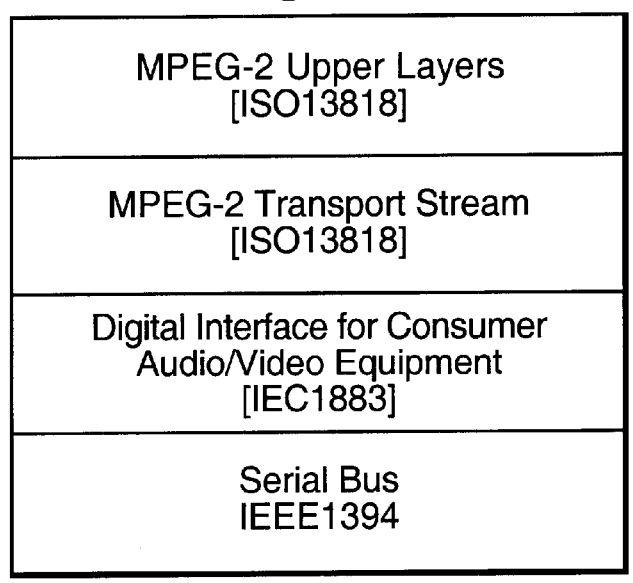
FIG. 10 illustrates a DVB Common Interface IEEE 1394 implementation Transport Stream Interface protocol stack.

FIG. 10 illustrates the various protocol layers making up the appropriate protocol stack.

Thus, the upper layers correspond to the MPEG upper layers which would be used for the Common Interface, such that the higher generic protocol layers of the Common Interface do not need any modifications.

To implement this system it is proposed that the Conditional Access Module and the host receiver each include at least one input plug and one output plug as defined in IEC 1883, a master input and output plug control register as defined in IEC 1883 and an input and output plug control register for each plug implemented, as defined in IEC 1883.

For the arrangement illustrated in FIG. 9, there will now be described a connection protocol which could be used to transmit transport streams between the host receiver 30 and Conditional Access Module 38.

First, the host 30 identifies all the DVB Common Interface Modules present on the network, preferably using the sub-unit mechanism defined in the AV/C-CTS protocol. The host 30 then requests from the isochronous resource manager the use of two isochronous channels each of the bandwidth necessary to carry the required transport stream.

The host 30 then configures the input plug control register of the Conditional Access Module 38 to receive a transport stream on the first isochronous channel and configures its own output plug control register to output the transport stream on that channel. The host 30 then configures the output plug control register of the module to output the transport stream on the second isochronous channel and configures its own input plug control register to receive the transport stream on that channel.

The host 30 can then send a scrambled transport stream over the first isochronous channel and receive the descrambled transport stream back from the module 38 on the second isochronous channel.

Since the Conditional Access Module 38 is not connected to any particular device, it is no longer essential that a descrambled clear transport stream must be sent back to the source 30 of the scrambled stream. Thus, the Conditional Access Module 38 may be used more flexibly and may send a clear stream to a different device to that from which the scrambled stream was received.

Clearly, the scrambled transport stream received by receiver 30 must be sent to the Conditional Access Module 38. However, it is then possible for the Conditional Access Module to send the descrambled transport stream only to the digital video recorder 32 (through the receiver) or to both the digital video recorder 32 and the receiver 30. Thus, the Conditional Access Module 38 must transmit to either one or two destinations.

In the example illustrated in FIG. 9, a first proposal is that the receiver 30 will have the necessary transport stream switching resources to receive the transport stream from the Conditional Access Module 38 and then reroute it on to the digital video recorder 32 via a third isochronous channel either as a normal IEEE Serial Bus transmission or as a Common Interface transport stream. Indeed, these resources will be used to route clear streams to the digital video recorder 32 when the Conditional Access Module 38 is not required. This proposal would allow only the program stream of interest to be sent to the digital video recorder 32, rather than the whole transport stream.

A second proposal is to use two transport stream connections, namely one from the host 30 to the module 38 and the other from the module 38 to the digital video recorder 32.

These connections could be set up and configured in a similar way to that described above, but with the second isochronous channel being set up between the module 38 and the digital video recorder 32. This would have the advantage of avoiding the need for the host receiver 30 to itself switch the program back to the digital video recorder 32. This in turn, will allow the use of the resources in the host receiver 30 for other applications or a cheaper implementation of the host.

Of course, in this case, the digital video recorder 32 would receive the whole transport stream, but could be arranged to strip out all of the streams which are not of interest either under the direction of the host 30 or in a stand alone mode.

The arrangement of FIG. 9 may also be configured as described below.

Instead of the host receiver 30 switching a required program stream back out to the digital video recorder 32, overlaid connections can be used. In particular, having set up isochronous connections between the host receiver 30 and the Conditional Access Module 38, the host receiver 30 then overlays a connection from the Conditional Access Module 38 to the digital video recorder 32. As mentioned above, overlaying a connection uses the same isochronous channel, but directs it to an additional destination, in this case, the digital video recorder 32.

This configuration has the advantage that the switching resources of the host receiver 30 are not used and also that no additional bandwidth is used in transmitting the transport stream on to the digital video recorder 32 in addition to the host receiver 30.

Once again, the second destination, in this case the digital video recorder 32, would receive the whole transport stream. However this, could be an advantage where the second destination is perhaps a display in another room. In particular, it would allow the selection of the program stream to be made independently from the host receiver 30.

The use of Conditional Access Modules in conjunction with the IEEE Serial Bus brings about the possibility of communication of another type not previously considered for the IEEE 1394 Serial Bus. As an example, rather than return a descrambled transport stream to the host receiver 30, the transport stream can be passed on to a second Conditional Access Module (not shown) for further processing or descrambling of other virtual channels of the transport stream. To do this, it is proposed that the host receiver 30 contacts the isochronous resource manager to request a third isochronous channel, configures the output control register of the first module 38 to remove the return connection between the first module 38 and the host 30 and sets up a new connection between the first 38 and second modules using the second isochronous channel. The host 30 then configures the input plug register of the second module to receive a transport stream on the second isochronous channel and configures the output plug control register of the second module to set up a connection between the second module and the host 30 using the third isochronous channel. It then configures its own input plug control register to receive the transport stream on the third isochronous channel.

Thus, whether all available modules or a selection of modules are utilised is at the option of the host.

According to the PC card implementation of the Conditional Access Module, the full transport stream as received by the host receiver is passed to the Conditional Access Module. Placing the transport stream at this level simplifies the interface, since the host receiver needs no knowledge of the operation of the Conditional Access Module. In particular, the Conditional Access Module can receive and use private streams of which the host receiver has no knowledge or understanding. These streams can include descrambling information, subscription information, etc.

The DVB Common Interface defines the transport stream bit rate as being at least 58 Mbit/s. Hence, to carry a transport stream to and from a Conditional Access Module over the IEEE 1394 Serial Bus requires a minimum of 116 Mbit/s of bandwidth. Furthermore, each additional module would require at least a further 58 Mbit/s of bandwidth. The IEEE 1394 Serial Bus has various standard bandwidths. However, as will be apparent from the above, the 100 Mbit/s Serial Bus would be precluded and the 400 Mbit/s Serial Bus would soon be filled up using Conditional Access Modules.

According to the IEEE 1394 Serial Bus standards, 63 devices may be used on any one bus. However, with Conditional Access Modules requiring such large bandwidths, there is a relatively low limit on the number of independent Modules which can be used on the bus.

Transmission of the full transport stream over the network is a very inefficient use of bandwidth, since any one Conditional Access Module usually descrambles only one or two virtual channels of the transport stream. The Conditional Access Module may also require other data streams in the transport stream, but these are generally of relatively small bit rates compared to the program streams containing video and audio information. Hence, it is likely that a large amount of information will be transferred around the network with only very little of it being processed by the Conditional Access Modules. This results in a restriction of the applications of the Conditional Access Module and other devices using the IEEE 1394 Serial Bus.

One solution to this problem would be for the receiver 30 to send out only those program streams which are to be processed. Since generally only one or two program streams are used at once, this would dramatically reduce the bit rate required and since the transport stream is a stream of packets, packets may be stripped out independently of the packets of other streams so as to leave a transport stream which is still compatible with the DVB Common Interface.

However, a Conditional Access Module usually requires additional streams containing entitlement and encryption information. If the host receiver cannot identify these streams, it is not able to determine which streams to send to each Conditional Access Module. Indeed, even if these streams can be identified, there may be so many different streams of information, that the number is beyond the capability of the host receiver to filter out and send.

Clearly, if these additional streams are not sent to the Conditional Access Module, then correct functioning of the module cannot be achieved.

A transport stream usually contains a table or map, for example MPEG Program Specific Information (PSI), indicating the various program streams present and other identifying maps. However, since not all the data in the transport stream need be identified in the table, a host receiver may not be able to identify the presence of certain data.

It would be possible for a Conditional Access Module to signal to the host receiver which streams it requires. However, this would necessitate an extension or modification to the higher layer functionality of the Common Interface standards and this is preferably to be avoided.

FIG. 11(*a*) illustrates schematically time multiplexed data streams, together with an associated table.

FIG. 11(*b*) illustrates schematically the table of FIG. 11(*a*).

As will be apparent, from the table, a device can determine the content of associated data streams, for example that data stream 1 relates to program Channel D. However, as illustrated, not all the data streams need be identified in the table.

It is proposed here that rather than have the host receiver identify the program streams which are required, it should identify the program streams which are known not to be required. In this way, the host receiver can safely strip out all the program streams which are not required whilst ensuring that any other data streams required by the Conditional Access Module will still be present in the transport stream sent to the Conditional Access Module.

Thus, for the example of FIG. 11, if Channel B is to be descrambled by the Conditional Access Module, then the host receiver strips out streams 1, 2 and 6, which it can determine from the table relate to broadcast Channels A, C and D. In this way, if there is any additional information in streams 3 and 5 which are required by the Conditional Access Module, this will still be sent to the Conditional Access Module.

In the case of MPEG streams, only program streams the host receiver can identify from the MPEG Program Specific Information (PSI) data are removed. This PSI data is specified in the MPEG-2 system specification (ISO/IEC 13818-1 Generic Coding of Moving Picture and Associated Audio Systems) and is always present in an MPEG transport stream and therefore can be used to identify the program streams present. By removing known program streams, private data of which the host receiver could have no knowledge is retained in the transport stream sent over the Common Interface on the IEEE 1394 Serial Bus.

As the dominant portion of the transport stream will consist of video program streams, removing unwanted video program streams will significantly reduce the bandwidth required by the Common Interface on the IEEE 1394 network.

We claim:

1. A network of digital multi-media devices connected through a serial bus conforming to the IEEE 1394 standard, comprising:

a receiver for receiving a scrambled transport stream comprising command data and a plurality of multiplexed channels from an external source and outputting the scrambled transport stream onto the serial bus;

at least one Conditional Access Module for receiving the scrambled transport stream output by the receiver from the serial bus, descrambling at least one of the multiplexed channels in accordance with the command data, and outputting the descrambled channels onto the serial bus; the Conditional Access Module being a separate component device connected to the serial bus and comprising at least a descrambler, a coder, a microprocessor, and a serial bus port; and at least one digital multi-media device for receiving the descrambled channels output from the Conditional Access Module.

2. The network according to claim 1, wherein said plurality of multiplexed channels correspond to a plurality of scrambled video programs.

3. The network according to claim 1, wherein the scrambled transport stream output by the receiver and the descrambled channels output from the Conditional Access Module are transmitted in isochronous channels over the serial bus.

4. The network according to claim 1, wherein said receiver comprises:

a reader for reading the contents of the scrambled transport stream and identifying the multiplexed channels which are not required for processing by the Conditional Access Module;

a stripper for stripping out from the scrambled transport stream at least some of the multiplexed channels identified as not being required; and a serial bus interface for outputting the channels of the scrambled transport stream that have not been stripped into the serial bus.

5. A Conditional Access Module for use as a separate component device on a serial bus network of digital multi-media devices, comprising:

a microprocessor for controlling the Conditional Access Module;

a serial bus interface conforming to the IEEE 1394 standard for receiving a scrambled transport stream from a receiver connected to the serial bus; the scrambled transport stream comprising command data and a plurality of multiplexed channels;

a descrambler for decrambling at least one of the multiplexed channels in accordance with the command data;

a coder for coding commands in accordance with the command data; and said serial bus interface transmitting the descrambled channels from said descrambler over the serial bus to at least one desired digital multi-media device.

6. The Conditional Access Module according to claim 5, wherein said plurality of multiplexed channels correspond to a plurality of scrambled video programs.

7. The Conditional Access Module according to claim 5, wherein the received scrambled transport stream and the output descrambled channels are transmitted in isochronous channels over the serial bus.

8. The Conditional Access Module according to claim 5, wherein said receiver comprises:

a reader for reading the contents of the scrambled transport stream and identifying the multiplexed channels which are not required for processing by the Conditional Access Module;

a stripper for stripping out from the scrambled transport stream at least some of the multiplexed channels identified as not being required; and a second serial bus interface for outputting the channels of the scrambled transport stream, that have not been stripped, onto the serial bus.

9. A method of networking digital multi-media devices over a serial bus conforming to the IEEE 1394 standard, comprising the steps of:

receiving a scrambled transport stream comprising command data and a plurality of multiplexed channels from an external source using a receiver;

outputting the scrambled transport stream from the receiver onto the serial bus;

receiving the scrambled transport stream output by the receiver from the serial bus using at least one Condition Access Module; the Conditional Access Module being a separate component device connected to the serial bus and comprising at least a descrambler, a coder, a microprocessor, and a serial bus port;

descrambling at least one of the multiplexed channels in accordance with the command data using the Conditional Access Module(s);

outputting the descrambled channels from the Conditional Access Module onto the serial bus; and receiving the descrambled channels from the serial bus using at least one digital multi-media device.

10. The method according to claim 9, wherein said plurality of multiplexed channels correspond to a plurality of scrambled video programs.

11. The method according to claim 9, wherein the scrambled transport stream output by the receiver and the descrambled channels output from the Conditional Access Module are transmitted in isochronous channels over the serial bus.

12. The method according to claim 9, wherein said receiver performs the steps of:

reading the contents of the scrambled transport stream;

identifying the multiplexed channels which are not required for processing by the Conditional Access Module;

stripping out from the scrambled transport stream at least some of the multiplexed channels identified as not being required; and outputting the channels of the scrambled transport stream that have not been stripped onto the serial bus.

* * * * *